April 28, 1953  D. F. CUNNINGHAM  2,636,423
MACHINE FOR MAKING PARTITIONS
Filed March 24, 1948  9 Sheets-Sheet 1

INVENTOR.
Donald F. Cunningham,
BY Rogers & Ezell,
Attys.

April 28, 1953  D. F. CUNNINGHAM  2,636,423
MACHINE FOR MAKING PARTITIONS
Filed March 24, 1948  9 Sheets-Sheet 2

April 28, 1953

D. F. CUNNINGHAM 2,636,423

MACHINE FOR MAKING PARTITIONS

Filed March 24, 1948

INVENTOR.
Donald F. Cunningham,
BY Rogers & Ezell,
Attys.

April 28, 1953 D. F. CUNNINGHAM 2,636,423
MACHINE FOR MAKING PARTITIONS
Filed March 24, 1948 9 Sheets-Sheet 4

INVENTOR.
Donald F Cunningham
BY Rogers & Ezell
attys.

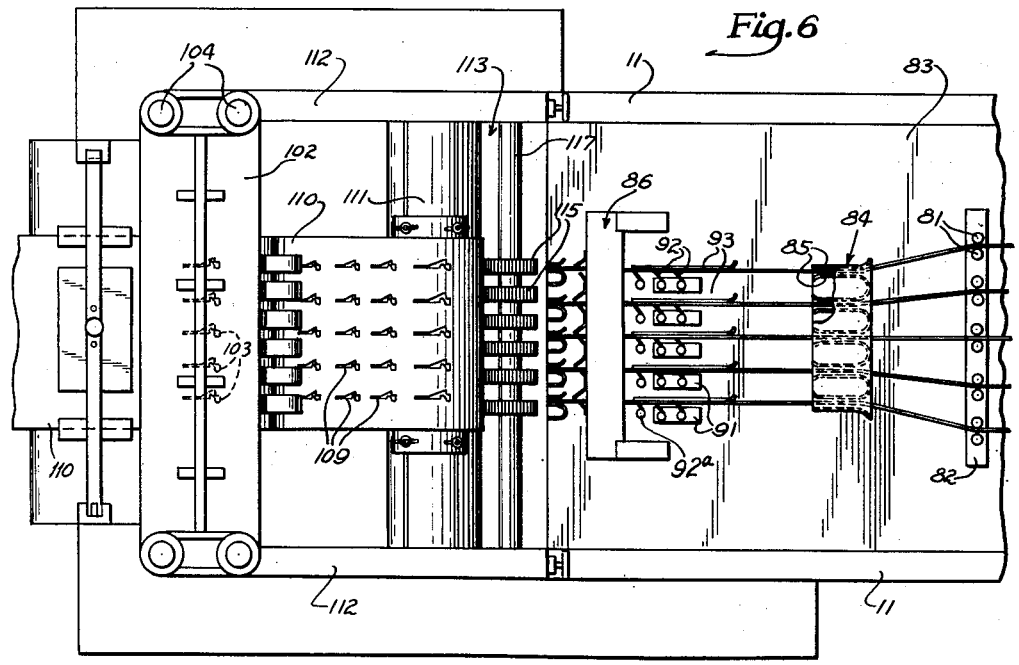
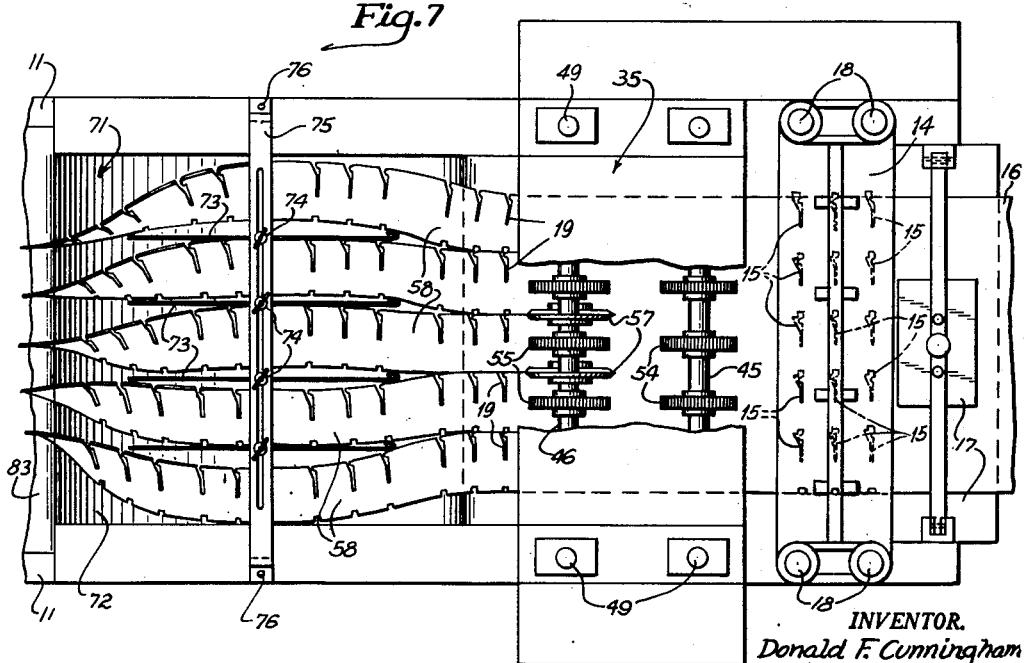

April 28, 1953     D. F. CUNNINGHAM     2,636,423
MACHINE FOR MAKING PARTITIONS
Filed March 24, 1948     9 Sheets-Sheet 6
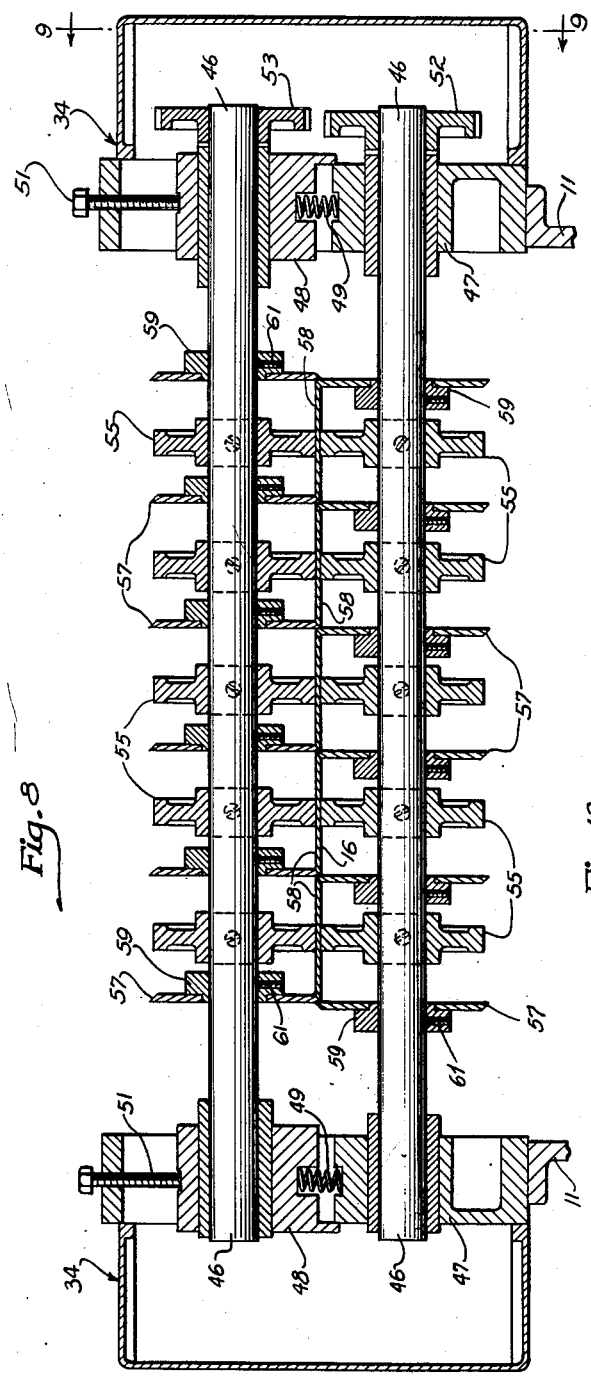
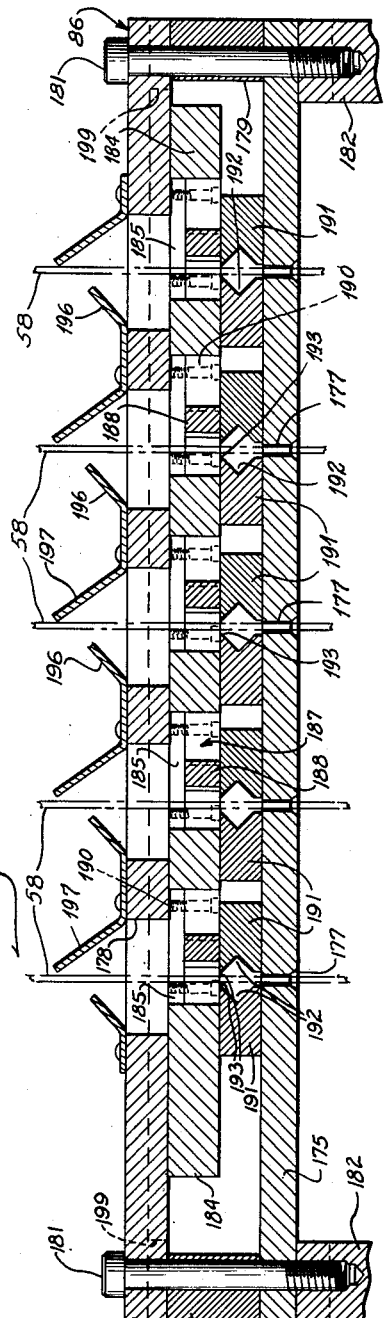
INVENTOR.
Donald F. Cunningham,
BY Rogers & Ezell,
Attys.

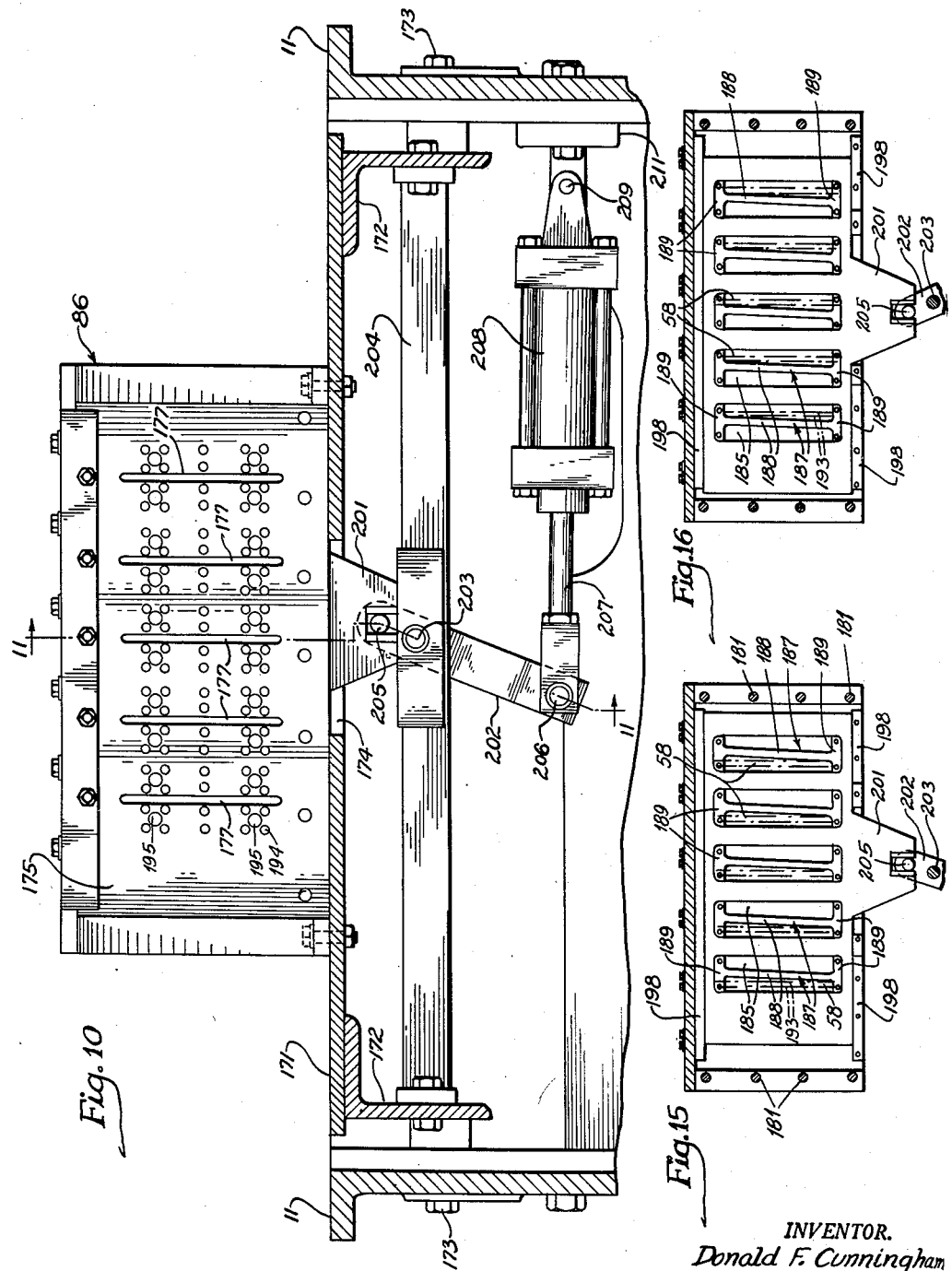

April 28, 1953  D. F. CUNNINGHAM  2,636,423
MACHINE FOR MAKING PARTITIONS
Filed March 24, 1948  9 Sheets-Sheet 8
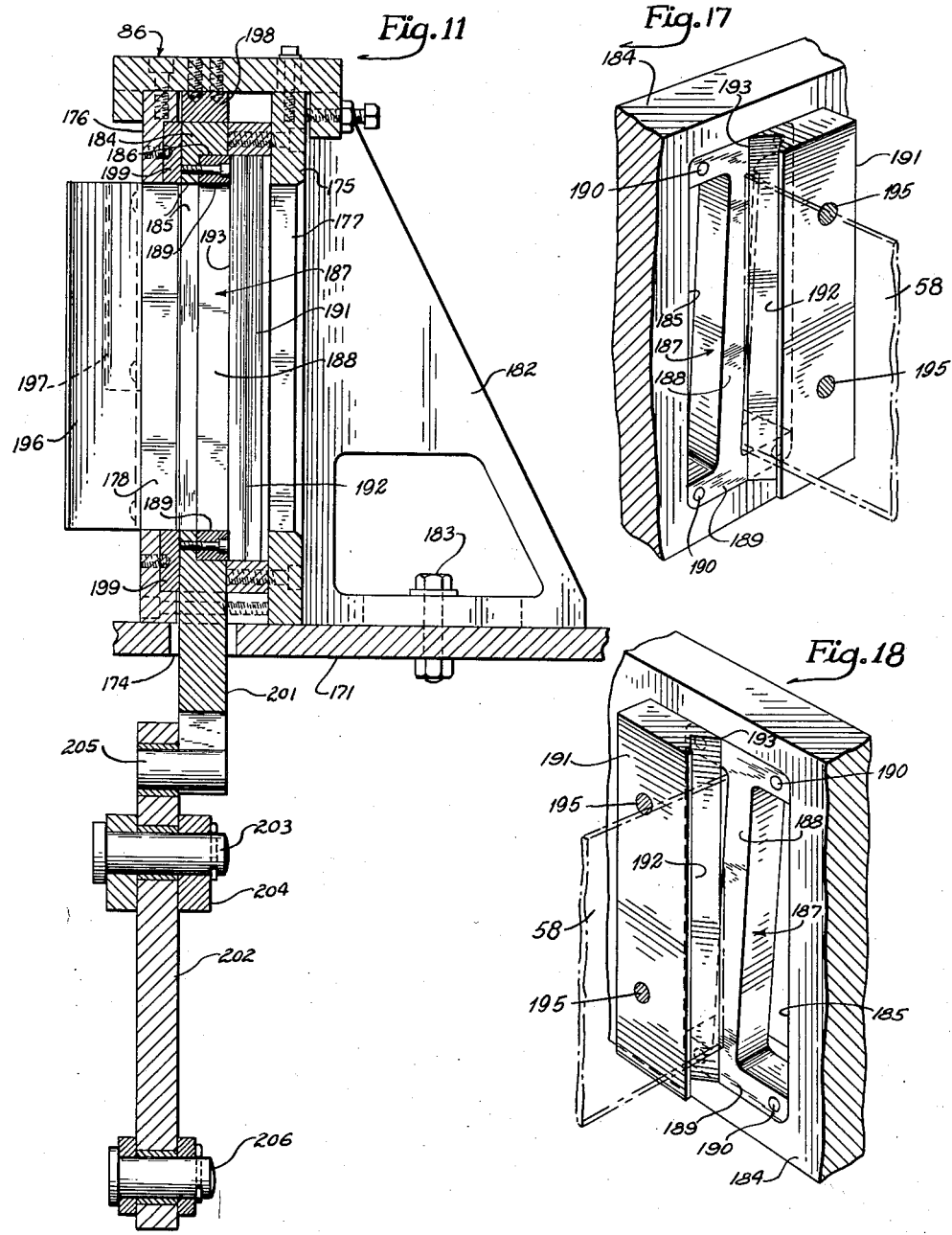
INVENTOR.
Donald F. Cunningham
BY Rogers & Ezell,
Attys.

April 28, 1953
D. F. CUNNINGHAM
2,636,423
MACHINE FOR MAKING PARTITIONS
Filed March 24, 1948
9 Sheets-Sheet 9
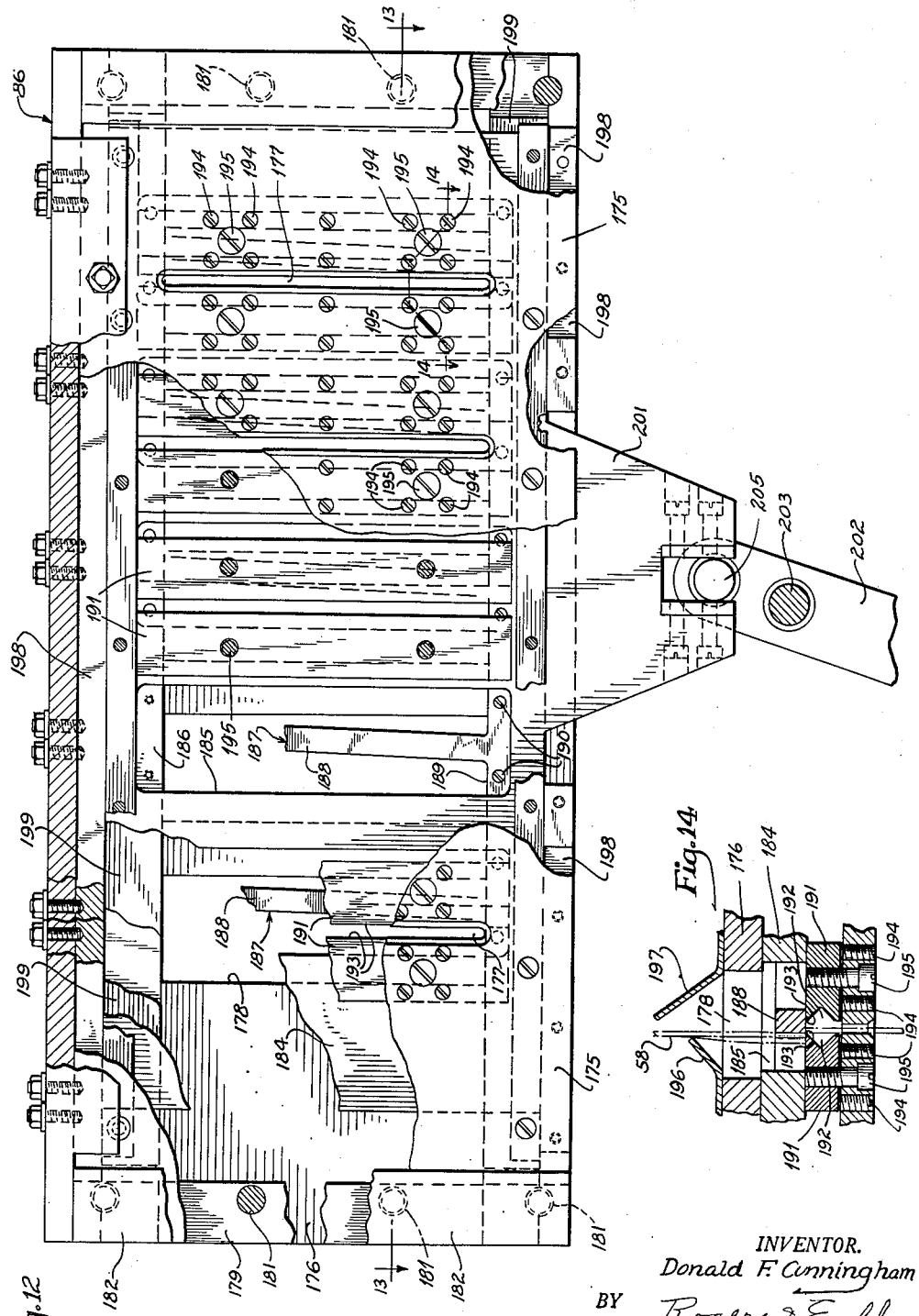
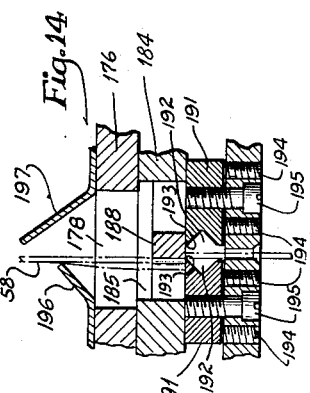
INVENTOR.
Donald F. Cunningham
BY Rogers & Ezell,
Attys.

Patented Apr. 28, 1953

2,636,423

UNITED STATES PATENT OFFICE 2,636,423

MACHINE FOR MAKING PARTITIONS

Donald F. Cunningham, Whitefish Bay, Wis., assignor to American Partition Corporation, Milwaukee, Wis., a corporation of Wisconsin Application March 24, 1948, Serial No. 16,768

20 Claims. (Cl. 93—37)

The invention relates to improvements in machines for making container partitions consisting of longitudinal and transverse paperboard strips having their opposite edges notched and slotted for interfitting and connection of the strips to form the walls of, for example, bottle cells.

The machine with which the present invention is more particularly concerned is of a type wherein two horizontally disposed relatively wide webs of paper, chipboard, cardboard, or other suitable sheet material, are operated upon by separate sets of punches and dies to form notched or slotted openings in the respective webs as the webs are fed into the machine step-by-step. One of the webs, after being die punched, is slit into longitudinal ribbons or strips which are then turned into vertically edgewise spaced parallel positions. The vertically disposed ribbons are cut to predetermined lengths, these partition lengths being then fed into and through an assembly zone in step-by-step manner. The end margin of the other web is brought into edgewise interlocking engagement with the outermost notches of said longitudinal severed lengths and is then severed transversely to form one of the transverse strips, there being one such transverse strip formed and interlocked in each step of the step-by-step advance of the severed lengths. When the desired number of transverse strips has been applied to the longitudinal severed lengths to provide a finished collapsible partition, said partition is ejected from the machine.

Known types of machines of this character are not entirely satisfactory from the standpoint of operating efficiency which, in some instances, results from improperly constructed cutting mechanism for severing the strips or ribbons, and in other instances because no means is provided to retain the ribbons slack prior to their being fed to the ribbon severing mechanism. Machines that retain the strips or ribbons taut at all times during their passage through the machine must be stopped frequently because the undue tension imposed upon the ribbons causes said ribbons to tear.

Therefore, an object of the present invention is to provide a novel fully automatic partition making machine which overcomes the deficiencies in such machines heretofore devised, and which efficiently fulfills its intended functions.

Another object is to provide, in a machine of the character referred to, a novelly constructed cutter or shearing mechanism operable to sever the longitudinal strips or ribbons before the partition is assembled.

Another object is to provide a machine of the kind referred to with simple and efficient means to turn the longitudinal ribbons from a horizontal into vertically edgewise position.

Another object is to provide, in a machine of this kind, simple, efficient and novel means for guiding, spacing, and feeding the vertically edgewise positioned longitudinal strips or ribbons into positions to be severed into predetermined lengths, and means for continuing the severed lengths into and through an assembly zone.

Another object is to provide a novel partition forming machine in which a battery of dies and punches simultaneously punches a web portion from which a set of longitudinal partition lengths is slit and cut in timed relation to the complete assembly with previously punched, slit, and cut longitudinal partition lengths of a predetermined number of transverse partition lengths.

Another object is to provide a novel mechanism to coordinate the operation of punches, dies and cutters with the step-by-step advance of the webs and strips.

Another object of the invention is to provide a machine of the character described which is simply and durably constructed, has a large output capacity, and can be adapted easily and quickly to make partitions of different dimensions in every particular.

Another object is to provide a partition forming and assembling machine with dual feed means for the web and ribbons fashioned therefrom and with means to maintain the ribbons slack while passing from one feed means to the other.

Another object is to provide means whereby the ribbons of paper extending from the slitting mechanism to the cutter mechanism will remain slack, and to support such slack ribbons, all to avoid tearing of the ribbons should the related mechanisms be out of operational phase.

Other and further objects of the present invention will be apparent from the following description and claims, and are illustrated in the accompanying drawings which, by way of illustration, show an exemplary embodiment and the principles thereof. Other embodiments of the invention embodying the same principle may be used, and structural changes may be made as desired by those skilled in the art, without departing from the present invention and the purview of the appended claims.

In the drawings:

Fig. 6 is a schematic plan view of the end of the machine illustrated in Fig. 4;

Fig. 7 is a schematic plan view partly broken away of the end of the machine illustrated in Fig. 5;

Fig. 8 is a transverse sectional view of the horizontal web slitting and feeding mechanism, taken substantially on line 8—8 of Fig. 5;

Fig. 9 is a detail sectional view showing the drive connection for the slitting and feeding roller mechanism, taken substantially on line 9—9 of Fig. 8;

Fig. 10 is a transverse sectional view taken substantially on line 10—10 of Fig. 1, showing the ribbon shearing mechanism and the actuating means therefor in elevation;

Fig. 11 is a vertical sectional view through the shearing mechanism and drive, taken substantially on line 11—11 of Fig. 10;

Fig. 12 is an enlarged elevational view of the ribbon shearing mechanism viewed in the same direction as illustrated in Fig. 10, but showing portions thereof progressively broken away to illustrate the structure in detail;

Fig. 13 is a horizontal sectional view of the shearing mechanism, taken substantially on line 13—13 of Fig. 12;

Fig. 14 is a horizontal sectional detail view taken substantially along the line 14—14 of Fig. 12;

Figs. 15 and 16 are schematic sectional elevational views of the shearing mechanism showing the reciprocal cutter in each of its two positions of rest;

Fig. 17 is a fragmentary perspective view of the reciprocal cutter showing one knife thereof in a cutting position assumed during a cutting operation while the cutter is moving from the rest position shown in Fig. 16 into the rest position shown in Fig. 15; and Fig. 18 is a fragmentary perspective view similar to Fig. 17, but showing the cutter knife in a cutting position assumed while the cutter is moving from the rest position shown in Fig. 15 into the rest position illustrated in Fig. 16.

Figure 2:
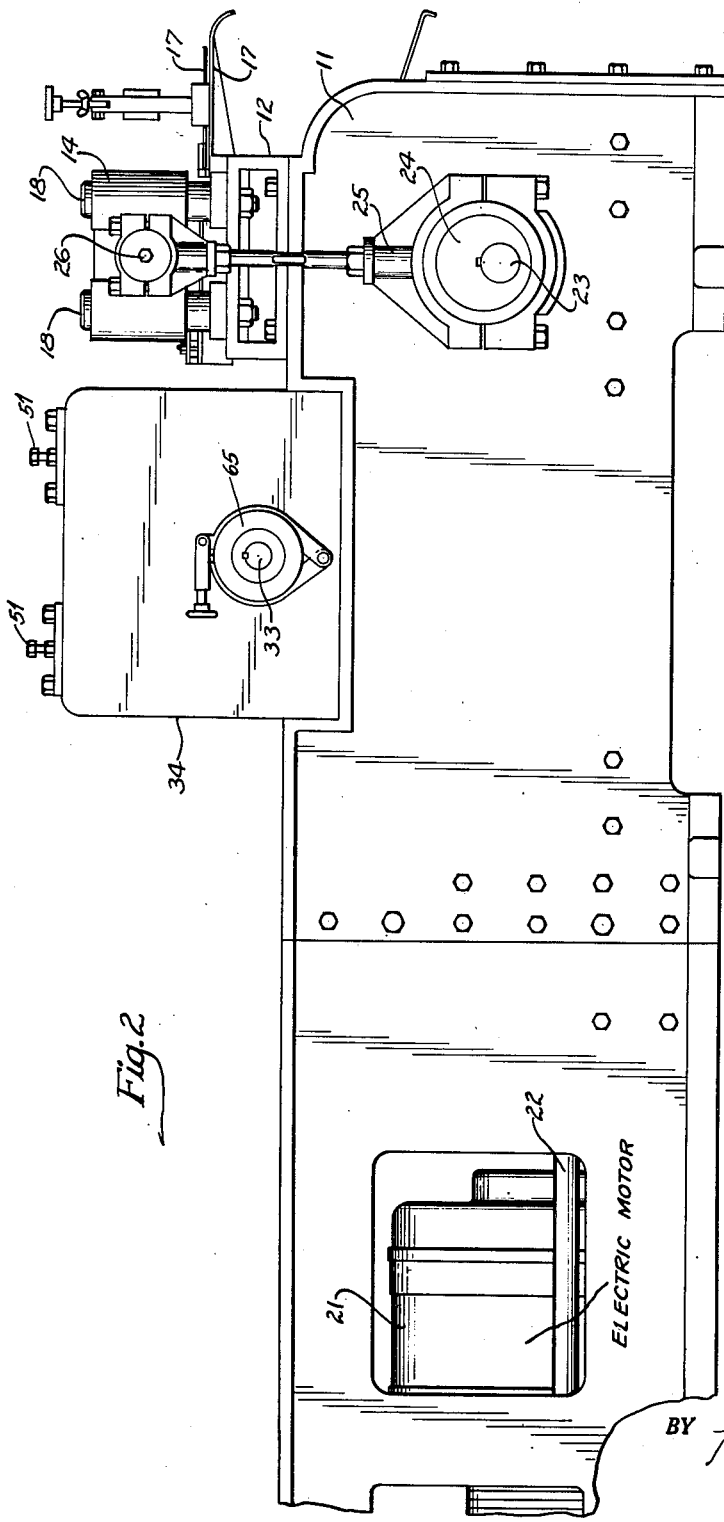
Fig. 2 is a side elevational view of the other end of the machine.

Referring to the accompanying drawings, the improved partition making and assembling machine includes suitable side frame members 11 for supporting various mechanisms thereof. At the end of the machine illustrated in Fig. 2, which may be termed the feed-in end, there is provided a laterally extending block-plate 12, which is mounted at its ends on the side frames 11 and is provided with die openings 13 (Fig. 5), and a horizontal vertically reciprocal crosshead 14 carrying three transverse rows of suitable punches 15 for simultaneously operating on a web 16 of paper, cardboard, chipboard, or the like, which is fed horizontally into the machine between tensioning plates 17 from a suitable supply source, not illustrated. The crosshead 14 is mounted at its ends on vertically disposed guide posts 18 and is adapted to reciprocate vertically thereon during machine operation so as to punch three spaced rows of suitable openings or slots 19 in the web 16 at each stationary interval as it is fed between the crosshead and block-plate by a step-by-step motion by mechanism and means to be described presently.

Operation of the punch and die mechanism, as well as the operation of other mechanism embodied in the machine and to be specifically described hereinafter, is effected through the operation of a single power source. Such power source may include a motor 21 arranged within the machine frame and having suitable connections, not shown, with a horizontally extending drive shaft 22, which shaft is operatively connected to the specific drives for the various mechanisms. Inasmuch as the various drive means connecting the driven shaft 22 with the operating mechanisms of the various parts of this machine do not constitute a feature of the present invention, such mechanisms have been omitted from the disclosure, it being sufficient to note that means is provided whereby operation of the driven shaft 22 imparts continuous rotation to a transverse shaft 23 journalled at its ends in the side frames 11 below the reciprocal crosshead 14. The shaft 23 carries at each end an eccentric 24 (Figs. 2 and 3) with which is operatively associated one end of a link structure 25 having its other end connected as at 26 to the crosshead 14. Obviously, continuous rotation of the shaft 23 will impart vertical reciprocation of the crosshead.

Figure 3:
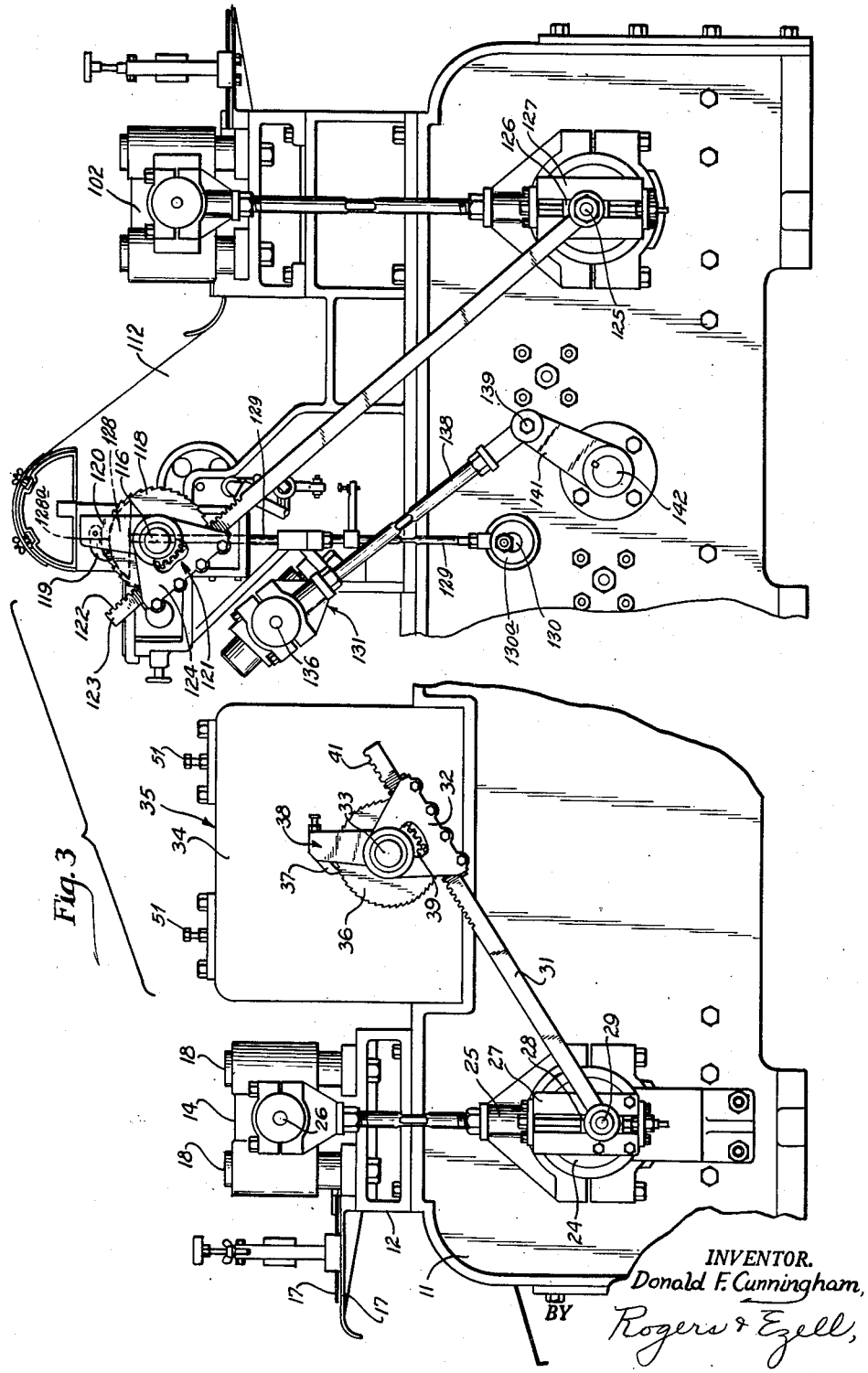
Fig. 3 is a fragmentary side elevational view of the machine, showing the medial portion thereof broken away, looking at the machine from the side opposite to that at which the machine in Figs. 1 and 2 is viewed.

The transverse shaft 23 also carries at one end, as illustrated in Fig. 3, a bell-crank bearing block 27 having mounted for adjustment therein a slide journal 28 including a trunnion 29 to which is connected one end of a rack bar 31. The link 31 extends upwardly and forwardly of the machine and its free end is slidably mounted in a yoke 32 freely journalled on a transverse shaft 33 which projects out of one of the end housings 34 of a web feeding and slitting mechanism generally indicated in Fig. 5 at 35. The shaft 33 has a ratchet 36 secured firmly thereon which ratchet is adapted to be engaged intermittently by a pawl 37 carried on the end of a radial arm 38 rotatably journalled on said shaft 33 and having a gear segment 39 at one end thereof which meshes with rack teeth 41 on one edge of the rack bar 31. It should be evident that continuous rotation of the driven shaft 23 will impart longitudinal reciprocal motion to the rack bar 31 to thereby oscillate the arm 38 and consequently impart step-by-step rotation to said shaft 33 through the pawl and ratchet engagement. In each stroke of the rack bar 31, sufficient rotation is imparted to the shaft 33 to move the web 16 through mechanism described below a linear distance equal to the length of the longitudinal partition lengths to be cut from the punched portion.

Figure 5:
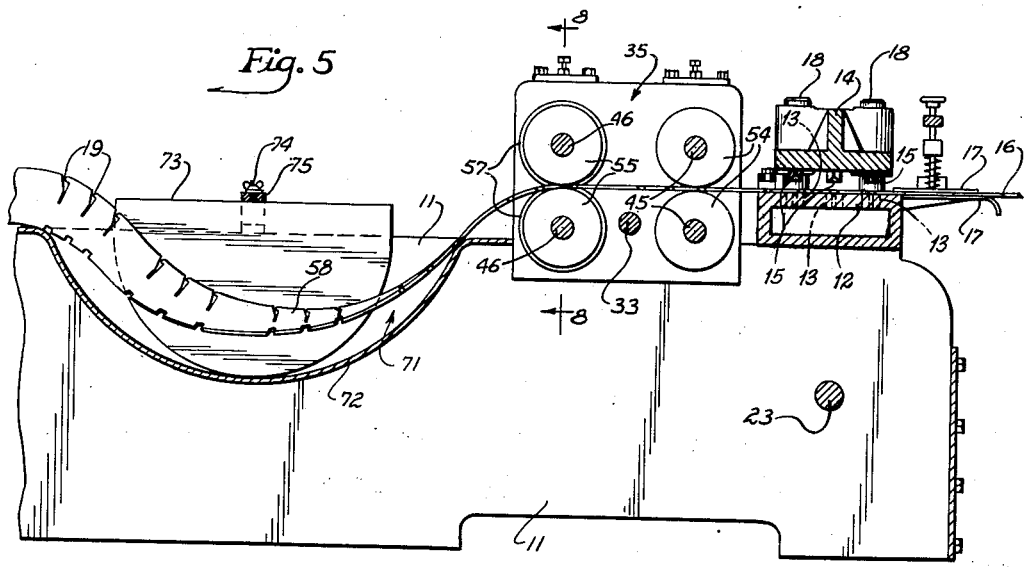
Fig. 5 is a central sectional view of the end of the machine shown in Fig. 2.

The shaft 33 extends through the end housings 34 and carries within one of said housings a gear 42 (Fig. 9) which meshes at all times with an idler gear 43 mounted upon a fixed idler shaft 44 within said end housing. Also journalled in said end housings 34 and extending transversely across the machine frame are a plurality of rotatable shafts 45 and 46. As best shown in Figs. 5 and 9, the shafts 45 and the shafts 46 are arranged in pairs, one of each pair on each side of the shaft 33 and the other of each pair on each side of the idler shaft 44. The lower shafts of each pair of shafts 45 and 46 are firmly journalled as at 47 in suitable bearings provided in one wall of each end housing 34, as is best shown in Fig. 8, which illustrates the mounting for one set of shafts. The upper shafts of each pair of shafts 45 and 46 are journalled in bearing blocks 48 which, as illustrated in Fig. 8, are held in spaced relationship above the fixed journals 47 as by means of springs 49, and may be adjusted downwardly against the tension of said springs by adjusting screws 51 which are threaded into tapped openings in the top of the end housings and coact with the top surface of the movable bearing blocks 48.

Each of the lower transverse shafts 45 and 46 carries a gear 52 (Fig. 9) within the end housing 34 which meshes at all times with the driven gear 42. The two upper shafts 45 and 46 likewise carry gears 53 which mesh at all times with the idler gear 43. Thus, it will be observed that, upon step-by-step rotation of the shaft 33, the transverse shafts 45 and 46 will be rotated intermittently.

The shafts 45 and 46 each carry a plurality of feed rollers 54 and 55, respectively, fixed thereto for rotation thereby. The feed rollers 54 are spaced apart longitudinally along both shafts 45 (Figs. 5 and 7) and are adapted to frictionally coact with opposed faces of the web 16 which passes therebetween. Intermittent rotation of these rollers intermittently advances the web through the punch and die mechanism in a step-by-step motion, each advance being preceded by actuation of the punch and die mechanism which operates to punch out laterally spaced notched slots 19 in said web. The web fed between the friction feed rollers 54 is delivered to and passes between the friction rollers 55 on the rotatable shafts 46. Upon referring specifically to Fig. 8, it will be observed that the friction rollers 55 also are spaced apart longitudinally on the shafts 46 and they, like feed rollers 54, embrace opposite faces of the web to facilitate its being fed therethrough and to prevent distortion of the web during the slitting operation to be described.

The shafts 46 also carry a plurality of cutting or slitting wheels 57 which are spaced apart longitudinally on said shafts preferably one between adjacent friction rollers 55. The slitting wheels 57 on the lower shaft 46 coact with the slitting wheels 57 on the upper shaft 46 to sever or slit the web as it passes through the feeding mechanism. The slitting of the web in a manner described provides a plurality of strips or ribbons 58 of a width corresponding to the height of the collapsible partitions which are fabricated and assembled in the present machine. Inasmuch as the machine is adapted to fabricate partitions of various sizes, the slitting wheels 57 are adjustable along the shafts 46. Such adjustment of the slitting wheels may best be effected by providing each of the wheels with a fixed collar 59 having a set-screw 61 therein which may be loosened to facilitate adjustment and then tightened to firmly secure the slitting wheels in the desired position thereon. A conventional brake device 65 on the free end of the shaft 33 (Fig. 2) prevents backup of the several feed rollers, and, hence, backup of the web 16.

The strips or ribbons 58 leaving the slitting wheels 57 drop downwardly into a trough 71 in the manner best shown in Figs. 5 and 7. The trough 71 may be fashioned in any suitable manner, but it is preferred that it include a semi-cylindrical-shaped sheet metal wall 72 which extends downwardly between the side frames 11. Tangling or inadvertent displacement of the plurality of ribbons 58 passing through the trough 71 is best prevented by providing said trough with a plurality of separators 73 which are substantially semicircular in outline and are adjustably mounted, as by means of bolts and wing nuts 74, on a transverse overhead bar 75 extending between the side frames 11 and having its ends firmly secured thereto as at 76. It should be observed that when the strips or ribbons 58 enter the trough 71 they lie in a substantially horizontal plane. Prior to the assembly of the partitions, said ribbons are moved into substantially vertical or upright positions.

Figure 4:
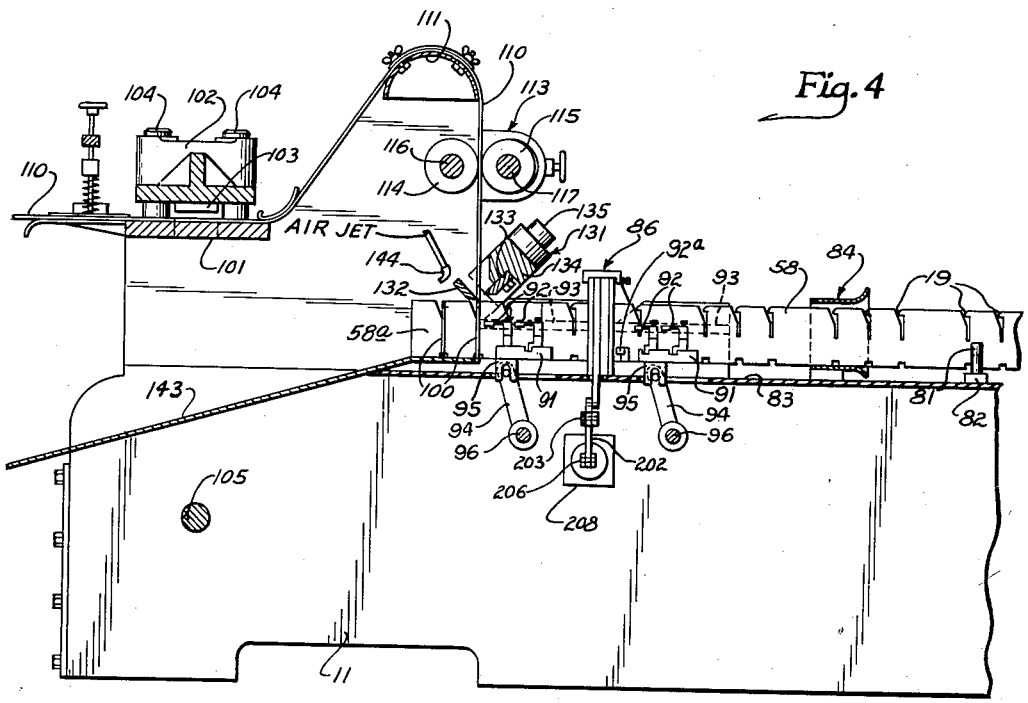
Fig. 4 is a vertical central sectional view of the end of the machine illustrated in Fig. 1, showing portions thereof in elevation and omitting nonessential details of construction.

Twisting of the ribbons 58 out of the horizontal plane and into a vertical plane may be effected substantially at their point of emergence from the trough 71. Upon referring to Figs. 4 and 6, it will be observed that each ribbon 58 passes between a pair of posts 81 projecting upwardly from a transverse bar 82 mounted on a top wall 83 bridging between the frame members 11 and extending forwardly from the discharge end of the trough 71. The ribbons passing between the posts 81 are then threaded through a spacer guide 84 also mounted on the top wall 83, which guide is best shown in Figs. 4 and 6. As illustrated, the guide 84 is substantially funnel-shaped at its forward or ribbon receiving end and is provided with a plurality of pairs of vertical walls 85 between each pair of which one of the ribbons extends. These pairs of walls 85 are spaced apart laterally of the machine distances corresponding to the desired spacing of the ribbons or strips in an assembled partition. As the ribbons 58 leave the funnel-shaped spacing guide 84, they are threaded through severing or shearing mechanism which is generally indicated at 86. This severing mechanism will be described in detail hereinafter.

Suitable reciprocal positive feed means is provided on either side of the severing mechanism 86 for simultaneously feeding the ribbons 58 through the severing mechanism 86 and severed lengths 58ᵃ forwardly therefrom. Such feed means is best shown in Figs. 4 and 6, and each includes a horizontally reciprocal bedplate 91 having a plurality of sets of yieldable fingers 92, the sets being spaced apart transversely of the machine distances corresponding to the spacing of the ribbons 58. In the structure shown, each set includes two fingers 92 spaced apart distances equal to spacing between slots 19 which are adapted to engage the slots 19 of a ribbon 58 or a severed length 58ᵃ to urge the same into contact with smooth backing plates 93 associated therewith and to move the same therealong. Mechanism for reciprocating the bedplates 91 longitudinally of the machine so as to advance the ribbons 58 and the severed lengths 58ᵃ in a step-by-step movement is shown in Fig. 4. As there illustrated, each bedplate 91 is operatively connected to a rock arm 94 by a slotted member 95 secured to each bedplate 91. Each rock arm 94 is mounted on one of a pair of oscillatably rotatable shafts 96 (Fig. 1) which are operatively connected in a manner to be described hereinafter with the power source.

In operation, the bedplates 91 move forwardly from a position of rest a distance sufficient to advance the ribbons 58 and severed lengths 58ᵃ engaged by the fingers 92 a distance corresponding to the spacing between the notched slots 19 therein. The slots 19 of the severed lengths 58ᵃ are adapted to receive in engagement therewith transverse partition strips 100 (Fig. 4) which are nested therewith during subsequently described operations. Upon their return movement, the fingers 92 ride freely over the ribbons 58 and severed lengths 58ª and stationary spring fingers 92ª engage and prevent the ribbons 58 and severed lengths 58ª from being carried rearwardly therewith. Before entering into a detail discussion of such subsequently described operations, reference is had to the feed mechanism and forming dies and cutters provided on the present machine for fabricating the transverse partition strips 100.

Figure 1:
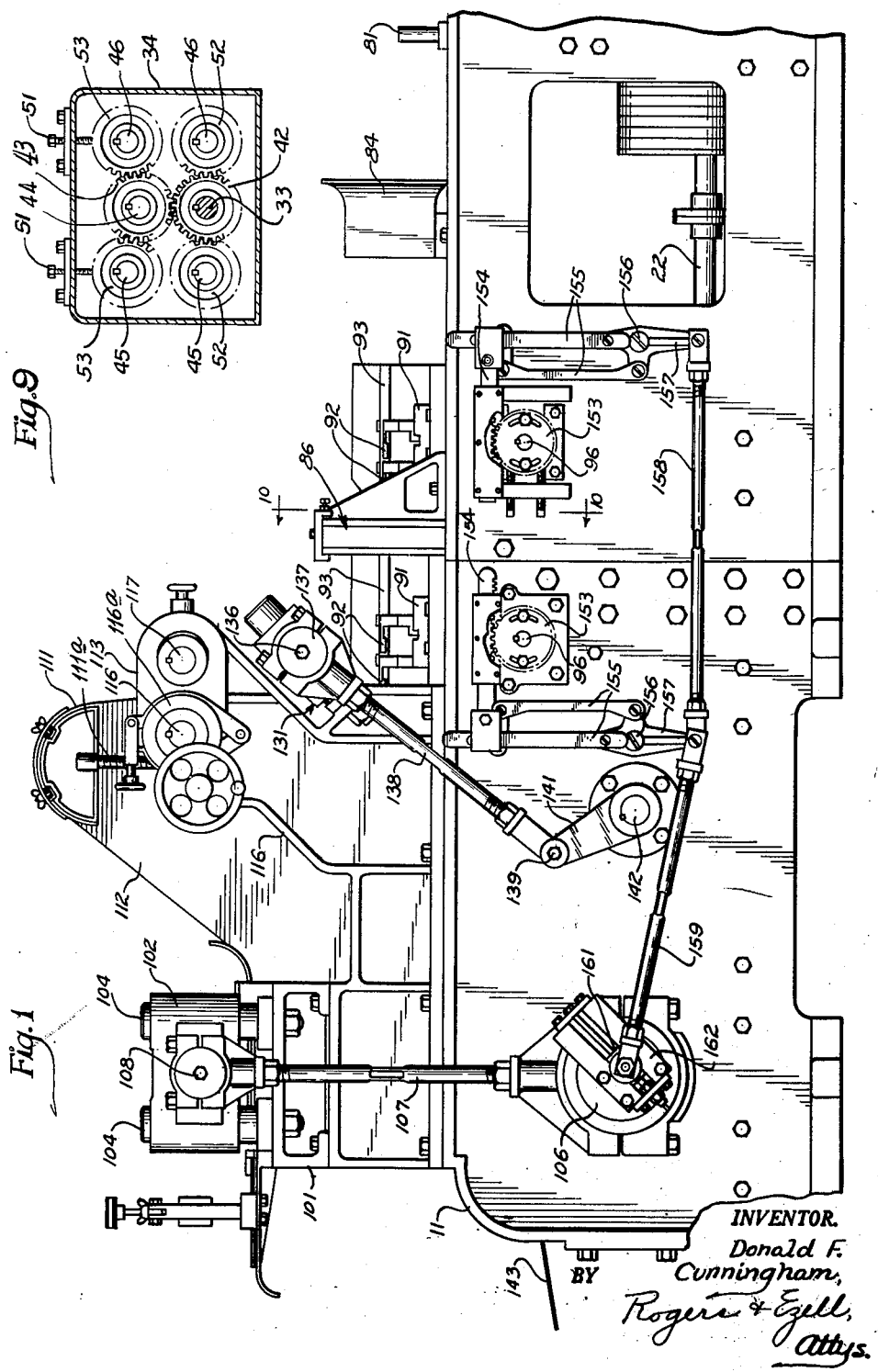
Fig. 1 is a side elevational view of one end of a partition fabricating and assembling machine embodying features of the invention.

Referring particularly to Figs. 1, 4 and 6, it will be observed that the machine end there depicted is provided with a transverse block-plate 101 having suitable die openings therein, and a transverse crosshead 102 carrying punches 103 which cooperate with the die openings in the block-plate 101. The crosshead 102 is mounted for vertical reciprocation on guide posts 104 firmly anchored at their lower ends on the side frame members 11. Vertical reciprocation of the crosshead 102 is obtained upon rotation of a driven shaft 105 (Fig. 4) carrying an eccentric 106 (Fig. 1) having a link structure 107 operatively associated therewith and which terminates at its upper end in a pivotal mounting at 108 on one end of the crosshead 102. It should be evident that, upon continuous rotation of the driven shaft 105 which receives its power from the drive shaft 22, the crosshead 102 is intermittently raised and lowered to effectively punch suitable notches or slots 109 in a horizontal web of material 110 passing between the crosshead and the block-plate. This web, which is perforated in the manner described, constitutes the material from which the transverse partition strips 100 are fabricated. As the web 110 passes out from beneath the crosshead 102, it is carried upwardly and over a semicircular transversely extending guide wall 111, mounted between the upper ends of frame standards 112 on vertical spaced threaded shafts 111ª, from where it is carried downwardly in a vertical plane between a driven feed roll mechanism generally indicated at 113.

This feed roll mechanism 113 includes feed rolls 114 and 115, which are mounted on transverse shafts 116 and 117, respectively. The shafts 116 and 117 are geared together so as to rotate in unison in opposite directions. The shaft 116 has a conventional backup prevention brake 116ª on one end (Fig. 1). The other end of the shaft 116 extends outwardly of one of the standards 112 (Fig. 3) and carries on its projecting end a ratchet 118. A pawl 119 carried on one end of a radial arm 120 loosely mounted about the shaft 116 coacts with the ratchet 118 and is adapted to impart step-by-step rotation to the shaft 116 when the arm 120 is moved in a counterclockwise direction. Rotation of the arm 120 about the shaft 116 is effected through a gear and rack connection generally indicated at 121 wherein rack teeth 122 are provided on one edge of a rack bar 123 slidable in a hanger bracket 124. The rack bar 123 extends downwardly at an angle forwardly, and has its lower end pivotally connected as at 125 to a bearing block 126 adjustably mounted in an eccentric block 127 mounted on and rotatable with the driven transverse shaft 105. A skip effecting member 128 is secured to the upper end of a vertically reciprocating shaft 129 mounted on a driven rotatable shaft 130 through an eccentric 130ª. The free edge of the member 128 is arcuate and smooth as indicated at 128ª, and is raised to receive the pawl 119 on each fourth stroke thereof to prevent movement of the web 110 into the spaces between partition lengths 58ª. Rotation of the shaft 105 will impart intermittent step-by-step rotation to the feed rollers 114 and 115 so as to intermittently advance the web 110 downwardly vertically.

The operation and intermittent step-by-step actuation of the feed mechanisms for the ribbons 58 and severed lengths 58ª and the web 110 is coordinated in such manner that step-by-step advance of the ribbons 58 and severed lengths 58ª positions one of the recessed slots 19 in each parallel severed length 58ª in vertical alignment below the end of the web 110 between each of its step-by-step advances downwardly between the feed rollers 114 and 115. The web 110 is advanced while the ribbons 58 and severed lengths 58ª are at rest between step-by-step advances, so that the lower marginal portion is nested into the notched slots 19 of the severed lengths 58ª to provide a transverse strip connecting said lengths 58ª in the spaced relation. After the lower marginal portion of the web 110 has been carried downwardly into nested position with the related severed lengths 58ª, suitable shearing mechanism, generally indicated at 131, is brought into play to sever the nested end margin of the web 110 from the remaining portion thereof.

The shearing mechanism 131 is best disclosed in Figs. 1 and 4 where it will be observed that it includes a stationary inclined cutter blade 132 which is located with its cutting edge in substantial contact with one face of the web 110. A movable cutter blade 133 is located on the opposite face of the web 110 preferably substantially at right angles to the cutter blade 132. This cutter blade 133 is carried in a transverse crosshead 134 mounted at its ends on posts 135 so as to be movable towards and away from the web 110 through operation of mechanisms to be described in detail presently. Such reciprocal movement of the cutter blade 133 shears the web 110 at the lower ends of the slots 109, and such shearing occurs immediately following the nesting of the lower margin of said web into the related severed lengths 58ª. It is noted here that the shearing takes place in substantial alignment with the top edges of the lengths 58ª; hence, no tamping is required to align the top edges of the lengths 58ª and the transverse strips 100.

Referring now to the disclosure in Figs. 1, 3 and 4, the crosshead 134 carrying the movable cutter blade 133 has trunnions 136 on its ends on which are pivotally mounted the upper ends 137 of a pair of links 138 which have their lower ends connected, as at 139, to a lever 141 mounted firmly on an oscillatable shaft 142 which extends transversely of and through the frame members 11. The oscillatable shaft 142 is operatively connected with the drive shaft 22 in a conventional manner that does not constitute a part of the present invention and consequently is not disclosed in detail. It should be noted, however, that the shaft 142 is oscillated in timed sequence to the step-by-step feeding of the web 110.

In the assembly of the partitions, the severed lengths 58ª are advanced step-by-step to successively locate a predetermined number of notched slots 19 in positions to receive transverse partition strips 100. After a predetermined number of said transverse partition strips 100 have been nested with the longitudinal severed lengths 58ª, the assembled partition is discharged from the machine down an incline 143, the discharge being assisted by a timed blast of air emitted through an air jet 144 located closely adjacent to the fixed cutting blade 132.

Referring now to the particular mechanism for reciprocating the ribbon feeding and tensioning means carried on the bedplates 91 and operatively connected to oscillate rotatable shafts 96, reference is again had to Fig. 1. As there shown, each shaft 96 carries a gear 153 on an end projecting outwardly to one side of one of the side frames 11. The gears 153 are operatively associated with like rack bars 154 carried on the upper ends of like link assemblies 155 which are pivoted at 156—156 and have their lower ends 157 operatively connected as by means of link bars 158 and 159 to an eccentric block 161 adjustably mounted in a bearing block 162 carried on the end of the rotatable shaft 105. This drive connection is such that, upon continuous rotation of the shaft 105, the link bars 158 and 159 are reciprocated to impart reciprocal oscillation to the link assemblies 155 and thereby reciprocate the rack bars 154 to effect limited rotation of both shafts 96 in both directions. Thus, it will be noted that the feed rollers for advancing the web 110 and the ribbon feeding mechanisms have a common drive-in shaft 105.

The ribbon severing or shearing mechanism generally indicated at 86 is best illustrated in Figs. 10 through 18, inclusive. Upon referring to Fig. 10, it will be observed that the shearing mechanism 86 is centrally mounted upon the machine midway between the side frames 11, said mounting including a horizontal bedplate 171 mounted at its edges on angle bars 172 which are firmly secured, as by bolts 173, to said side frames. The bedplate 171 is provided with an opening 174 through which operating means for the shearing mechanism extends. Extending upwardly from the bedplate 171 is a pair of spaced parallel plates 175 and 176. The front plate 175, which is disposed substantially vertically, has a plurality of vertical slots 177 therein which are spaced apart longitudinally thereof distances corresponding to the spacing between the ribbons 58. The other, or rear, plate 176 is similarly provided with slotted, vertical openings 178, which openings are substantially coextensive with the slots 177 and in registering alignment therewith. However, the openings 178 are considerably wider than the slots 177 for purposes that will be understood as the discussion proceeds. The plates 175 and 176 are held in spaced relationship by end spacers 179 and the assembly is firmly secured at each end, as by bolts 181, to mounting brackets 182, which brackets are substantially triangular in shape and have their bases firmly secured, as by bolts 183, to the bedplate 171.

A horizontally reciprocal plate 184 is mounted within the space between the spaced vertical plates 175 and 176. This plate 184 is of a length substantially less than the space between the end spacers 179 and it is provided with a plurality of longitudinally spaced, substantially rectangular openings 185 of such width as to permit ribbons 58 to extend therethrough without interference when the latter are threaded through the registering openings 177 and 178. The upper and lower margins of the substantially rectangular openings 185 in the reciprocal plate 184 are suitably recessed, as at 186, to afford mounting surfaces for cutter blades indicated generally by the numeral 187. As is perhaps best shown in Figs. 15 and 17, a cutter blade is mounted in each opening 185. These blades each consist of a substantially H-shaped configuration with the bar 188 of the H inclined slightly out of the vertical and the leg portions 189 of said H rested in the recesses 186. Suitable machine screws 190 are provided to secure the cutter blades in place firmly on the reciprocal plate 184.

The cutting edges of the vertically inclined cutter blades 187 are adapted to cooperate with fixed cutting edges associated therewith. As best shown in Figs. 12, 14 and 18, fixed cutting edges are provided upon a series of vertically disposed bars 191, one of which is disposed on either side of each vertical slot 177 in the front plate 175. Each of the bars 191 has a substantially V-shaped edge 192 which defines cutting edge 193 disposed in close proximity to the related cutter blade 187. Each bar 191 is mounted for adjustment towards and away from the related cutter blade so as to be adjustable with relation to said blade for insuring the proper shearing of a ribbon extended therethrough. Such adjustment is best effected by providing a plurality of pressure screws 194 in the front plate 175, which screws have their inner ends bearing against one face of the related bar 191 as shown in Fig. 14. Preferably, four such screws are provided in the area of each mounting screw 195. It should be evident that the bars 191 may be moved towards or away from the cutter blades 187 upon initially loosening the pressure screws 194 and then adjusting the position of the bars 191 by manipulation of the holding screws 195, after which the pressure screws 194 may again be moved into firm contact with the newly positioned bar 191.

In operation, the reciprocal plate 184 carrying the cutter blades 187 is moved in one direction only each time the ribbons 58 are to be sheared. The construction of the cutter blades 187 is such that either edge of the bar portion 188 thereof may cooperate with one or the other shearing edge 193 of the related bars 119. Thus, when the ribbons 58 extend through the openings 185 of the reciprocal plate 184 on the left hand side of the cutter bars 187, as is illustrated in Figs. 15 and 18, the ribbons will be sheared by said cutter bar when said plate is moved to the left. The reciprocal plate 184 remains in this position while the ribbons 58 are again fed step-by-step through the shearing mechanism. This results in the ribbons passing through the openings 185 on the right hand side of the cutter bars 187, as best indicated in Fig. 17. As soon as a predetermined number of step-by-step advances have occurred, the reciprocal plate 184 is then moved to the right to thereby carry the cutter bar 187 through the ribbons to dispose said cutter bar on the right hand side thereof during the subsequent feeding operation. This intermittent movement of the reciprocal plate 184 is repeated following the assembly of successive partitions. If desired, stabilizing plates 196—197 may be secured to the outside face of the rear plate 176, one on each side of each opening 177. Wear plates 198 may be provided in the cutter assembly for both the top and bottom edges of the reciprocal plate 184 and similar wear plates 199 are carried on the inside face of the rear plate 176.

Reciprocation of the cutter plate 184 may be obtained by any suitable means; however, it is preferable that hydraulic means be provided owing to the necessity of positive operation in both directions. Upon again referring to Fig. 10, it will be observed that the reciprocal plate 184 has a lug 201 depending downwardly through the opening 174 in the bedplate 171. The upper end of a link 202, which is pivotally mounted at 203 to a crossbar 204, has a pin and slot connection, as at 205, with the depending portion 201.

The lower end of said link 202 is connected, as at 206, to the end of a piston rod 207 extending out of a hydraulic cylinder 208 which, for freedom of operation, is pivotally mounted at 209 on a bracket 211 firmly secured to the inside face of one of the side frames 11. A piston carried on the piston rod within the cylinder 208 is actuated in both directions by means of hydraulic pressure obtained from any suitable source so as to be actuated in timed sequence to the actuation of the feeding and assembling mechanism. In this manner, the piston rod 207 will move in one direction or the other each time a predetermined number of transverse partition strips has been assembled with the ribbons.

Although an exemplary embodiment of the invention has been disclosed herein, it should be quite evident that the machine as a whole is capable of embodying a wide variety of modifications in detail structure. It should be evident also that the ribbon shearing or cutting mechanism in particular is such as to insure clean and positive shearing of the ribbons at predetermined intervals of machine operation, and that said mechanism may embody modifications in its detail structure and in its mode of operation, all without departing from the spirit of the invention or the scope of the appended claims.

What is claimed is:

1. In a machine of the character described, the combination of a frame structure, vertically reciprocal web-punching mechanism, step-by-step web-feeding mechanism including slitting means for slitting the web into ribbons all located at one end of the frame structure, reciprocatable ribbon-feeding mechanisms, ribbon-severing mechanism, and severed partition lengths feeding mechanism for feeding severed partition lengths to and through an assembly zone all located between the ends of said frame structure, and web-punching, feeding and severing mechanisms at the other end of said machine, said last mentioned feeding mechanism being disposed to feed a web into an assembly zone into interengaging relationship with severed partition lengths, said last-named severing mechanism being operable to cut the last-named web into transversely disposed partition lengths after interengagement of the web-end with severed partition lengths in the assembly zone, and means actuable to operate all of said mechanisms in timed sequence so as to deliver partition lengths cut from the ribbons and transversely disposed partition lengths to and through an assembly zone as set forth.

2. In a partition assembling machine, web-punching means, web feeding means and means for slitting the web into ribbons, ribbon-severing means, ribbon-feeding means operable to move the ribbons intermittently at a different rate from said web feeding means, means between the web-slitting means and the ribbon-feeding means for turning the ribbons from a horizontal plane to a vertical plane, said ribbon-feeding means comprising reciprocatable elements yieldably biased towards engaged ribbons, and a partitioned trough disposed to receive and guide the ribbons during their travel between the slitting means and said elements, said trough being of sufficient depth to provide slack in the ribbons between said web slitting means and said ribbon-severing means.

3. In a machine of the character described, the combination of side frame members, vertically reciprocable web-punching mechanism, step-by-step rotative feed roll mechanism for feeding the web in a horizontal plane, slitters in said feed roll mechanism for slitting the web into ribbons, a trough to receive said ribbons having a bottom below the normal plane of the ribbons, guide means at the discharge end of said trough for turning the ribbons from a horizontal into a vertical position, a cutter assembly, and step-by-step feed means operable at a different rate from said feed roll mechanism to feed the ribbons through the cutter assembly after leaving said guide means.

4. In a machine of the character described, the combination of a frame structure and means thereon for guiding and severing a plurality of ribbons of paper, said means comprising guides, one for each ribbon, ribbon-feeding mechanism, ribbon-severing mechanism, guide means for maintaining severed ribbon portions in edgewise positions, and feeding mechanism for the severed portions of the ribbons for feeding the same forwardly in their edgewise positions, respectively arranged in the order named, said severed portions feeding mechanism being disposed for feeding severed ribbon portions through an assembly zone.

5. In a method of automatically forming partitions, the steps of advancing one web of material of which partition lengths are formed through punching and slitting zones and into a slack zone at one intermittent rate of movement, withdrawing slit ribbons of web from the slack zone and feeding them through a partition lengths severing zone at another rate of intermittent movement, simultaneously advancing a second web through punching and partition lengths severing zones at an intermittent rate of movement, assembling end portions of the second web with severed partition lengths of the one web in an assembly zone, and severing each end portion of the second web after assembly.

6. In a method of automatically forming partitions, the steps of simultaneously intermittently feeding two webs of material towards an assembly zone, separately die punching each web, slitting one web into ribbons of widths equal to the desired depth of the partitions, severing the ribbons into partition lengths, feeding the ribbons to and through the point of severing at an intermittent rate different from the feeding rate of the original web from which the ribbons are formed, holding the ribbons slack intermediate slitting and severing zones, feeding the severed partition lengths of the one web through an assembly zone, and assembling partition lengths of the other web with the partition lengths of the one web as the latter pass through the assembly zone.

7. In a partition making machine, in combination, means for die punching a web of partition forming material, means for slitting the web into ribbons, means for feeding the web to and through said punching and slitting means, means for feeding the ribbons at a different rate from said web feeding means, means for turning the ribbons into vertical parallel positions, trough means between the turning means and the slitting means for receiving the ribbons having a depth to permit substantial slack in the ribbons, means for severing the ribbons into partition lengths, means for feeding the severed partition lengths through a partition assembly zone in parallel spaced positions, means for die punching a second web of material, means for feeding the second web to and through said punching means and for feeding the free end of the second web into transverse relation with the parallel partition lengths, means for severing the free end of the second web after being fed into assembled relation with the parallel partition lengths, and means for actuating all of said means intermittently and in timed relationship.

8. In a partition making machine, in combination, means for die punching a predetermined linear portion of a web of partition forming material throughout the area thereof from which a plurality of partition lengths may be formed by predetermined slitting and cutting, means for slitting the web into ribbons, means for feeding the web to and through said punching and slitting means, means for feeding the ribbons at a different rate from said web feeding means, means for turning the ribbons into vertical parallel positions, trough means between the turning means and the slitting means for receiving the ribbons having a depth to permit substantial slack in the ribbons, means for severing the ribbons into partition lengths, means for feeding the severed partition lengths through a partition assembly zone in parallel spaced positions, means for die punching a second web of material, means for feeding the second web to and through said punching means and for feeding the free end of the second web into transverse relation with the parallel partition lengths, means for severing the free end of the second web after being fed into assembled relation with the parallel partition lengths, and means for actuating all of said means intermittently and in timed relationship.

9. In combination, a partition making machine comprising intermittently operable mechanisms for separately feeding two webs of material of which said partitions are made towards a partition assembly zone, separate mechanisms for intermittently die punching the webs, means for cycling one of said die punching mechanisms and means for cycling said other die punching mechanism a predetermined number of cycles for each predetermined time increment of operation of said machine, means for slitting into ribbons the web punched by said one die punching mechanism, means for severing the ribbons into partition lengths, means for feeding the partition lengths through the partition assembly zone, means for guiding the other web for intermittent intersection of the free end with the partition lengths cut from the ribbons, means for severing the free end portion of the other web after each intersection with the partition lengths, and means for actuating all of said mechanisms and means intermittently and in timed relationship.

10. In a machine of the character described, the combination of side frame members, vertically reciprocable web-punching mechanism, step-by-step rotative feed roll mechanism for feeding the web in a horizontal plane, slitters in said feed roll mechanism for slitting the web into ribbons, a trough to receive said ribbons having a bottom below the normal plane of the ribbons, guide means at the discharge end of said trough for turning the ribbons from a horizontal into a vertical position, a cutter assembly, step-by-step feed means operable to feed the ribbons through the cutter assembly after leaving said guide means at a different rate from said web feeding mechanism, and step-by-step ribbon partition lengths feed means disposed ahead of said cutter assembly for feeding severed ribbon partition lengths through an assembly zone.

11. In combination in a partition making machine, means for slitting a paperboard web into ribbons and for intermittently feeding the ribbons forwardly therefrom, additional feeding means operable at a different rate of movement for intermittently feeding the ribbons spaced forwardly from said first mentioned feeding means, and a trough between and extending below said two feeding means for receiving the ribbons, said trough being of a depth to permit adequate slack in ribbons extending between said two intermittent feeding means to reduce tearing to a minimum.

12. In combination, in a partition making machine, means for slitting a paperboard web into ribbons and for intermittently feeding the ribbons forwardly therefrom, additional feeding means operable at a different rate of movement for intermittently feeding the ribbons spaced forwardly from said first mentioned feeding means, a trough between and extending below said two feeding means for receiving the ribbons, and partitions in said trough dividing the same into ribbon channels for preventing entangling of ribbons, said trough being of a depth to permit adequate slack in ribbons extending between said two intermittent feeding means to reduce tearing to a minimum.

13. In combination, in a partition making machine, timed associated mechanisms for die-punching web, for slitting the die-punched web into ribbons, and for intermittently feeding the ribbons forwardly, means for turning the ribbons from horizontal to vertical positions, means for severing the ribbons into partition lengths, means for intermittently feeding the ribbons to and through said ribbon severing means, means forwardly of said severing means for intermittently feeding severed partition lengths forwardly through an assembly zone, timed associated mechanisms for die-punching, intermittently feeding, and severing into transversely disposed partition lengths a second web, said last mentioned severing mechanism being disposed for severance of the die-punched end of the second web after transverse interengagement with the severed partition lengths of the ribbons, and mechanism for rendering said second web feed mechanism inoperative to feed the second web for one stroke of said associated die-punching mechanism immediately following completion of each partition assembly.

14. In combination, in a partition making machine, timed associated mechanisms for die-punching a web, for slitting the die-punched web into ribbons, and for intermittently feeding the ribbons forwardly, means for turning the ribbons from horizontal to vertical positions, means for severing the ribbons into partition lengths, means for intermittently feeding the ribbons to and through said ribbon severing means, means between said two feeding means providing for a substantial slack in the ribbons to prevent snapping thereof during feeding, and means forwardly of said severing means for intermittently feeding severed partition lengths forwardly through an assembly zone, said two feeding means adjacent said ribbon severing means being operable at a feeding rate different from the feeding rate of said web feeding mechanism and being operable in shorter segments of movement than said web feeding mechanism.

15. In combination, in a partition making machine, reciprocatable means for simultaneously die-punching a portion of a web of material for subsequent slitting and severing to form a plurality of parallel partition lengths, means for intermittently feeding the die-punched web forwardly, means for slitting the die-punched web into a plurality of ribbons, means spaced forwardly of said slitting means for intermittently feeding the ribbons forwardly, said ribbon feeding means being operable a predetermined number of times for each feeding operation of said web feeding means, and means between said two feeding means providing for a substantial maximum slack in the ribbons so that said feeding means may function as aforesaid without snapping the ribbons.

16. In combination, in a partition making machine, reciprocatable means for simultaneously die-punching a portion of a web of material for subsequent slitting and severing to form a plurality of parallel partition lengths, means for intermittently feeding the die-punched web forwardly, means for slitting the die-punched web into a plurality of ribbons, means spaced forwardly of said slitting means for intermittently feeding the ribbons forwardly, said ribbon feeding means being operable a predetermined number of times for each feeding operation of said web feeding means, means between said two feeding means providing for a substantial maximum slack in the ribbons so that said feeding means may function as aforesaid without snapping the ribbons, ribbon severing means forwardly of said ribbon feeding means for severing the ribbons into partition lengths, and means forwardly of said severing means for intermittently feeding severed partition lengths forwardly through an assembly zone.

17. In combination, in a partition making machine, reciprocatable means for simultaneously die-punching a portion of a web of material for subsequent slitting and severing to form a plurality of parallel partition lengths, means for intermittently feeding the die-punched web forwardly, means for slitting the die-punched web into a plurality of ribbons, means spaced forwardly of said slitting means for intermittently feeding the ribbons forwardly, said ribbon feeding means being operable a predetermined number of times for each feeding operation of said web feeding means, means between said two feeding means providing for a substantial maximum slack in the ribbons so that said feeding means may function as aforesaid without snapping the ribbons, ribbon severing means forwardly of said ribbon feeding means for severing the ribbons into partition lengths, means forwardly of said severing means for intermittently feeding severed partition lengths forwardly through an assembly zone, means for die-punching a second web for severing to provide transverse partition lengths, means for intermittently feeding the second web through the associated die-punching means and the die-punched free end thereof into transverse interengaging relation with the severed ribbon partition lengths, and means for severing the die-punched free end of the second web after interengagement with the severed ribbon partition lengths.

18. In combination, in a partition making machine, reciprocatable means for simultaneously die-punching a portion of a web of material for subsequent slitting and severing to form a plurality of parallel partition lengths, means for intermittently feeding the die-punched web forwardly, means for slitting the die-punched web into a plurality of ribbons, means spaced forwardly of said slitting means for intermittently feeding the ribbons forwardly, said ribbon feeding means being operable a predetermined number of times for each feeding operation of said web feeding means, means between said two feeding means providing for a substantial maximum slack in the ribbons so that said feeding means may function as aforesaid without snapping the ribbons, ribbon severing means forwardly of said ribbon feeding means for severing the ribbons into partition lengths, means forwardly of said severing means for intermittently feeding severed partition lengths forwardly through an assembly zone, means for die-punching a second web for severing to provide transverse partition lengths, means for intermittently feeding the second web through the associated die-punching means and the die-punched free end thereof into tranverse interengaging relation with the severed ribbon partition lengths, means for severing the die-punched free end of the second web after interengagement with the severed ribbon partition lengths, and means for rendering said second web feed means inoperative to feed the second web immediately following completion of each partition assembly to prevent feeding the second web between adjacent ends of severed ribbon partition lengths.

19. In combination, in a partition making machine, timed associated mechanisms for die-punching a web, for slitting the die-punched web into ribbons, and for intermittently feeding the ribbons forwardly, means for turning the ribbons from horizontal to vertical positions, means for severing the ribbons into partition lengths, means for intermittently feeding the ribbons to and through said ribbon severing means, said last mentioned ribbon feeding means comprising pivotally and reciprocably mounted fingers engageable with the die-punched ribbons in forward movement thereof, and means forwardly of said severing means for intermittently feeding severed partition lengths forwardly through an assembly zone, said forwardly disposed severed partition lengths feeding means comprising pivotally and reciprocably mounted fingers engageable with the die-punched severed partition lengths, said two groups of fingers being mounted for simultaneous forward and rearward motions, so that said forwardly disposed fingers when in operation move severed partition lengths forwardly through an assembly zone simultaneously with forward movement of the ribbons through the severing means by said ribbon feeding fingers with the severed partition strips, and severed partition lengths are maintained adjacently ahead of and in the same plane with the ribbons from which severed.

20. In a machine of the character described, the combination of side frame members, vertically reciprocatable web-punching mechanism, step-by-step rotative feed roll mechanism for feeding the web in a horizontal plane, slitters for slitting the web into ribbons, a trough to receive said ribbons having a bottom below the normal plane of the ribbons, and step-by-step feed means operable at a different rate from said web feeding means for feeding ribbons through said trough.

DONALD F. CUNNINGHAM.

(References on following page)

References Cited in the file of this patent

UNITED STATES PATENTS

| Number | Name | Date |
|---|---|---|
| 722,329 | Sheperd | Mar. 10, 1903 |
| 824,155 | Sheperd | June 26, 1906 |
| 889,643 | Swift | June 2, 1908 |
| 1,073,393 | Campus | Sept. 16, 1913 |
| 1,206,496 | Axcell | Nov. 28, 1916 |
| 1,213,728 | Beach | Jan. 23, 1917 |
| 1,475,247 | Segur et al. | Nov. 27, 1923 |
| 1,804,644 | Rosener | May 12, 1931 |
| 1,887,976 | Jensen | Nov. 15, 1932 |
| 1,964,827 | Mason et al. | July 3, 1934 |
| 1,972,699 | Beck | Sept. 4, 1934 |
| 1,996,188 | Benoit et al. | Apr. 2, 1935 |
| 2,031,879 | Daneke et al. | Feb. 25, 1936 |
| 2,135,060 | Voss | Nov. 1, 1938 |
| 2,221,865 | Dauber | Nov. 19, 1940 |
| 2,353,405 | King | July 11, 1944 |